United States Patent
Söder et al.

(10) Patent No.: US 10,405,203 B2
(45) Date of Patent: Sep. 3, 2019

(54) ESTABLISHING USEFULNESS OF REMOTE ANTENNA UNITS IN A WIRELESS COMMUNICATIONS SYSTEM

(71) Applicant: Telefonaktiebolaget LM Ericsson (publ), Stockholm (SE)

(72) Inventors: Johan Söder, Stockholm (SE); Henrik Asplund, Stockholm (SE); Mårten Ericson, Luleå (SE); Arne Simonsson, Gammelstad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/575,945

(22) PCT Filed: May 28, 2015

(86) PCT No.: PCT/EP2015/061824
§ 371 (c)(1),
(2) Date: Nov. 21, 2017

(87) PCT Pub. No.: WO2016/188579
PCT Pub. Date: Dec. 1, 2016

(65) Prior Publication Data
US 2018/0152853 A1 May 31, 2018

(51) Int. Cl.
*H04W 36/14* (2009.01)
*H04W 24/02* (2009.01)
(Continued)

(52) U.S. Cl.
CPC .......... *H04W 24/02* (2013.01); *H04W 16/20* (2013.01); *H04W 24/06* (2013.01); *H04W 24/08* (2013.01); *H04W 88/085* (2013.01)

(58) Field of Classification Search
CPC ........................... H04W 52/243; H04W 36/14
(Continued)

(56) References Cited

U.S. PATENT DOCUMENTS 5,890,054 A * 3/1999 Logsdon ............... H04W 76/50
455/11.1
6,236,365 B1 * 5/2001 LeBlanc ............... G01C 21/206
342/457
(Continued)

FOREIGN PATENT DOCUMENTS

WO 2013151470 A1 10/2013
WO 2015069159 A1 5/2015

OTHER PUBLICATIONS

International Search Report and Written Opinion issued in International Application No. PCT/EP2015/061824, dated Jan. 29, 2016, 13 pages.

*Primary Examiner* — William D Cumming
(74) *Attorney, Agent, or Firm* — Rothwell, Figg, Ernst & Manbeck, P.C.

(57) ABSTRACT

A method (10) performed in a wireless communications system (10) for establishing usefulness of remote units is provided. The wireless communications system (10) monitors one or more remote units ($2_i$, $2_j$, ..., $2_N$) of a distributed antenna system (1). The method (10) comprises: establishing (11), per remote unit ($2_i$, $2_j$, ..., $2_N$), received signal strength of a wireless communication; establishing (12), per remote unit ($2_i$, $2_j$, ..., $2_N$), a quantity related to the obtained received signal strength; and establishing (13) a measure on usefulness of each of two or more remote units ($2_i$, $2_j$, ..., $2_N$) based on the received signal strength and on the quantity. A corresponding wireless communications system, computer programs, and computer program products are also provided.

28 Claims, 5 Drawing Sheets

(51) Int. Cl.
*H04W 16/20* (2009.01)
*H04W 24/08* (2009.01)
*H04W 24/06* (2009.01)
*H04W 88/08* (2009.01)

(58) Field of Classification Search
USPC ......... 370/342, 253; 455/11.1, 15, 434, 437, 455/562.1
See application file for complete search history.

(56) References Cited

U.S. PATENT DOCUMENTS

| | | | | |
|---|---|---|---|---|
| 6,477,162 B1* | 11/2002 | Bayley | ............... | H04B 1/70752 370/342 |
| 6,760,588 B2* | 7/2004 | Okajima | ................ | H04B 7/022 370/338 |
| 6,952,181 B2* | 10/2005 | Karr | ..................... | G01C 21/206 342/457 |
| 7,209,190 B2* | 4/2007 | Katsube | ................. | H04H 20/26 348/838 |
| 7,812,766 B2* | 10/2010 | Leblanc | ............... | G01C 21/206 342/457 |
| 8,391,862 B1* | 3/2013 | Harju | .................... | H04W 48/16 370/350 |
| 8,644,758 B2* | 2/2014 | Fox | ..................... | H04B 7/15542 455/11.1 |
| 8,994,591 B2* | 3/2015 | Dupray | ................ | G01C 21/206 342/457 |
| 9,473,962 B2* | 10/2016 | Hsin | .................. | H04W 72/085 |
| 9,781,685 B2* | 10/2017 | Tsui | .................... | H04W 52/243 |
| 9,954,287 B2* | 4/2018 | Henry | .................... | H01Q 21/00 |
| 2001/0018346 A1* | 8/2001 | Okajima | ................ | H04B 7/022 455/437 |
| 2008/0026797 A1* | 1/2008 | Nanda | .................... | H01Q 1/246 455/562.1 |
| 2011/0096736 A1 | 4/2011 | Kwon et al. | | |
| 2011/0189949 A1* | 8/2011 | Fox | .................... | H04B 7/15542 455/15 |
| 2011/0306380 A1 | 12/2011 | Zavadsky et al. | | |
| 2012/0176929 A1* | 7/2012 | Choi | .................... | H04W 76/10 370/253 |
| 2012/0208581 A1 | 8/2012 | Ishida et al. | | |
| 2014/0169195 A1* | 6/2014 | Hsin | .................... | H04W 24/06 370/252 |
| 2015/0288427 A1* | 10/2015 | Wang | ...................... | H04W 72/1273 370/329 |
| 2017/0208520 A1* | 7/2017 | Sato | ....................... | H04W 36/14 |

\* cited by examiner

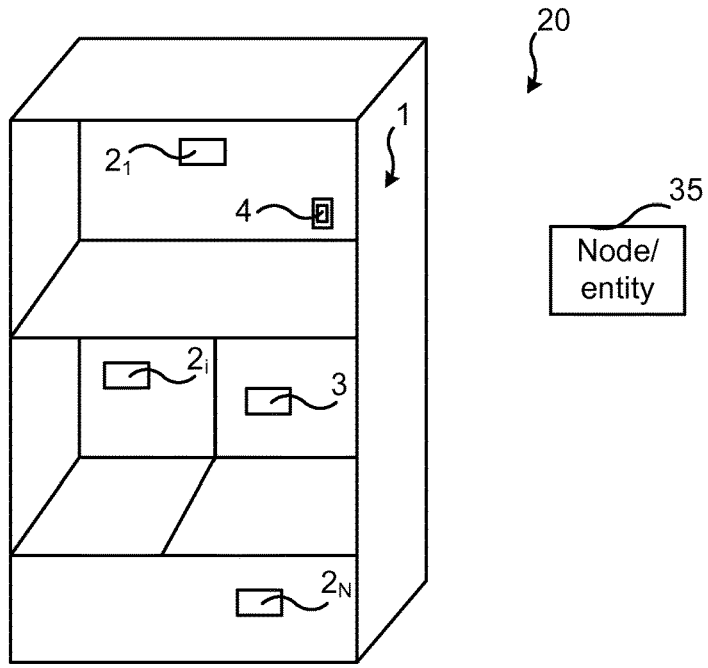
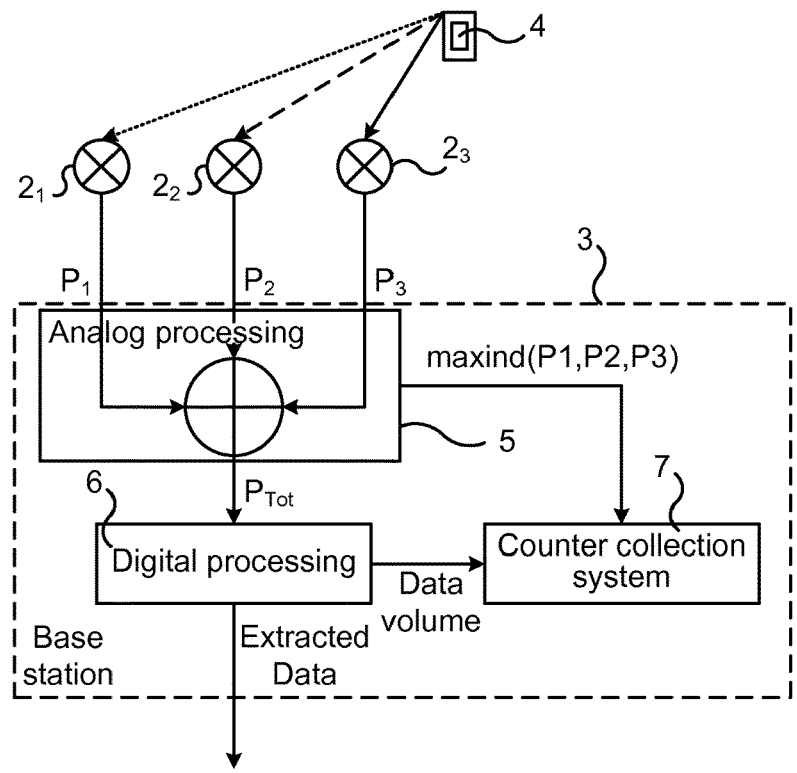
Fig. 1
Fig. 2

ESTABLISHING USEFULNESS OF REMOTE ANTENNA UNITS IN A WIRELESS COMMUNICATIONS SYSTEM

CROSS REFERENCE TO RELATED APPLICATION(S)

This application is a 35 U.S.C. § 371 National Stage of International Patent Application No. PCT/EP2015/061824, filed May 28, 2015, designating the United States, the disclosure of which is incorporated by reference.

TECHNICAL FIELD

The technology disclosed herein relates generally to the field of distributed antenna systems, and in particular to method for establishing usefulness of remote units, wireless communications system, computer program and computer program product.

BACKGROUND

There exists a variety of In Building Systems (IBS) for deployment of antennas in an indoor environment, e.g. in a building. A Distributed Antenna System (DAS) has been the most common solution, wherein a number of antenna end points (also denoted antenna points) are distributed within the indoor environment. The antenna points are all connected to a central point, which for instance may comprise a network node, such as a base station of a radio access network. The antenna points provide user terminals with wireless services within an indoor coverage area (also denoted cell).

When deploying the DAS, it is done with a goal of maximizing the coverage of each antenna point. However, after deployment it is difficult to get feedback on whether or not the deployment was successful. For instance, an unnecessarily high number of antenna points may have been installed, the antenna points may have been installed at non-optimal positions, or an insufficient number of antenna points may have been installed.

IBS solutions are sometimes low cost, including low cost planning and installation. There is no time for detailed propagation prediction and planning. Antenna positions may then typically be decided based on some rules of thumb, e.g. assuming a certain antenna point to cover a certain area.

Existing IBS planning tools are not very accurate regarding propagation prediction. Also, in order to get good predictions on signal propagation, detailed input on wall-material, obstacles and other issues relevant for the signal propagation are required. Such detailed input may not be obtained easily. In addition, the spatial distribution of the wireless traffic within a building can be difficult to predict, e.g. whether there are "hot spots" where many users seek wireless services. Such spatial traffic distribution may also change in dependence on building usage, e.g. due to a new business occupant having a different need and use of wireless services than a previous business occupant. The spatial traffic distribution may even change at organization changes of existing business within the building.

If a key performance indicator (KPI), such as cell KPIs or customer complaints, calls for a reconfiguration of a cell, the KPIs do not give much insight on how to add or move the antenna points in order to improve the performance. Typically, either trial and error is relied on using the same method as used at the initial installation or else a more costly investigation effort is needed.

When a cell split is required, e.g. in order to enable reuse of communication resources within the wireless network, it can be difficult to determine an antenna point allocation that would give a balanced load between the newly created cells.

From the above it is realized that there is a need for improvements in view of efficiency of deployments of DAS.

SUMMARY

An objective of the present disclosure is to solve or at least alleviate at least one of the above mentioned drawbacks of prior art.

The objective is according to an aspect achieved by a method performed in a wireless communications system for establishing usefulness of remote units. The wireless communications system monitors one or more remote units of a distributed antenna system. The method comprises establishing, per remote unit, received signal strength of a wireless communication; establishing, per remote unit, a quantity related to the obtained received signal strength; and establishing a measure on usefulness of each of two or more remote units based on the received signal strength and on the quantity.

By means of the method, feedback on the usefulness of the different antenna points is provided. The feedback may be used in many different ways to increase the efficiency of DAS deployments, in particular deployment of active DAS. For instance, a particular deployment may be reconfigured based on the feedback and guidelines for future deployments may be updated based on observations of existing deployments. The method thereby enables significant cost savings for equipment and installation of future deployments. Another advantage provided by the method is that it enables identification of how well the distribution of antenna points matches the spatial distribution of traffic. A good match between the antenna point distribution and traffic will increase the gains from future cell splits in which different antenna points are associated with different cells rather than a common cell. Further, the method provides assistance in identifying which antenna points should belong to which cells. This key performance indicator (KPI) per antenna point simplifies and improves a reconfiguration of the cell compared to when only KPIs per cell are available.

The objective is according to an aspect achieved by a computer program for a network node. The computer program comprises computer program code, which, when executed on at least one processor on the network node causes the network node to perform the method as above.

The objective is according to an aspect achieved by a computer program product comprising a computer program as above and a computer readable means on which the computer program is stored.

The objective is according to an aspect achieved by wireless communications system for establishing usefulness of remote units. The wireless communications system is configured to monitor one or more remote units of a distributed antenna system. The wireless communications system is configured to: establish, per remote unit, received signal strength of a wireless communication, establish, per remote unit, a quantity related to the obtained received signal strength, and establish a measure on usefulness of each of two or more remote units based on the received signal strength and on the quantity.

Further features and advantages of the present disclosure will become clear upon reading the following description and the accompanying drawings.

BRIEF DESCRIPTION OF THE DRAWINGS

FIG. 1 illustrates schematically an environment in which embodiments of the present disclosure may be implemented.

FIG. 2 illustrates an exemplary scenario and processing according to aspects of the present teachings.

DETAILED DESCRIPTION

Figure 3:
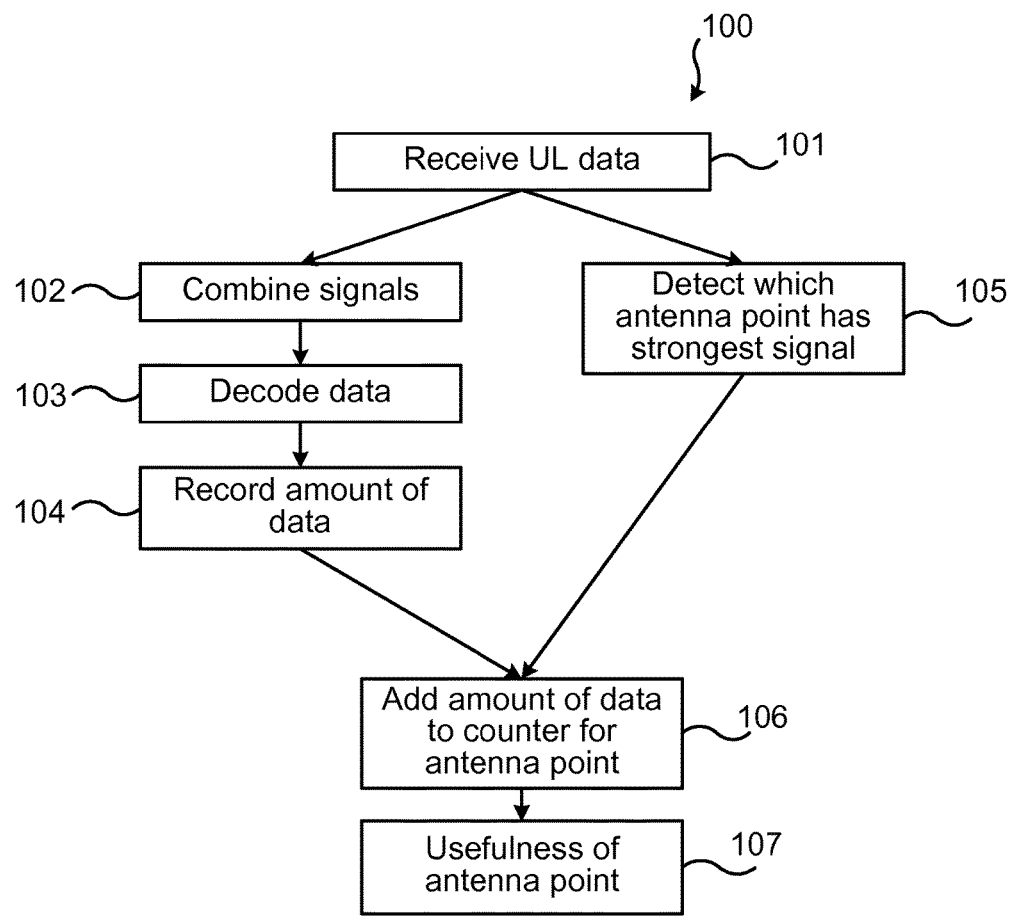
FIG. 3 is a flow chart illustrating aspect of the present teachings.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present teachings disclose in various embodiments a method for determining how useful each antenna point in a certain (active) DAS installation actually is, e.g. with respect to its coverage and to the amount of traffic that is served through the antenna point. This may be achieved by associating radio link and system KPI samples with individual antenna points, and subsequently forming KPI statistics per antenna point.

In one embodiment, the identification of which antenna point(s) to associate with a certain measurement is based on injecting antenna point specific signatures on top of the communication signal, and measuring the relative strengths of different signatures in the combined signal.

In another embodiment, the DAS may, at predetermined times, enter an evaluation mode in which antenna points are turned off one by one and variations in performance or traffic may be observed.

A goal is to determine if installed antenna points are badly (well) placed with respect to the spatial distribution of the traffic, and hence if more (or less) antenna points are needed.

FIG. 1 illustrates an environment in which embodiments of the present teachings may be implemented. In particular, a wireless communications system 20 is illustrated. The wireless communications system 20 comprises a distributed antenna system 1, which is illustrated as being deployed in a building. It is noted that such DAS 1 is typically deployed in an indoor environment, and will in the following be exemplified by an indoor environment. However, it is noted that the DAS 1 may also be deployed in an outdoors environment.

The DAS 1 comprises a number N of antenna points $2_1, \ldots, 2_i, \ldots, 2_N$ arranged at different locations within the building. The "antenna point" may also be denoted for instance "radio dot", "radio head", "radio point", "remote unit". The antenna points $2_1, \ldots, 2_i, \ldots, 2_N$ cover the indoor environment, denoted cell, enabling wireless communication for user terminals 4 residing in the building, i.e. within the coverage area (cell). All the antenna points $2_1, \ldots, 2_i, \ldots, 2_N$ are connected to a central point 3, e.g. comprising a base station of a radio access network or an intermediate node being connected to such base station. In the following the central point is exemplified by a base station. The DAS 1 is typically part of a wireless system, e.g. a 3G or 4G system, i.e. the wireless communications system 20 may for instance comprise a 3G or 4G system. In some embodiments, the indoor environment comprises a cell controlled by a base station 3 (e.g. an evolved Node B, eNodeB) of the wireless communications system 20, e.g. a Long Term Evolution (LTE) system.

The wireless communications system 20 may comprise or be connected to additional nodes for implementing aspects of the present teachings. Such additional node is schematically illustrated at reference numeral 21. For instance, embodiments of a method according to the present teachings may be implemented in a single network node, e.g. the base station 3, or it may be implemented in a distributed fashion, wherein some steps are performed in a first network node, e.g. the base station 3, while others are performed in a second network node, e.g. the additional network node 40 which may for instance comprise a node or entity of the wireless communications network 20 or a node or entity of an external packet data network (not illustrated), e.g. a server of a cluster of servers (e.g. Internet).

There are generally three types of DAS: active, passive and hybrid. The present teachings are mainly applicable to active DASs. In an active DAS 1, the antenna points $2_1, \ldots, 2_i, \ldots, 2_N$ each comprises means for amplifying the signal, and in some cases also for translating the received signal to a different frequency. This frequency can be both lower and higher than the original frequency. In an active DAS 1 based on fiber-optical repeaters, the signal is transformed into an optical signal that is transmitted over low loss optical fibers to the base station 3 where it is converted back to radio frequency (RF) and subsequently digitalized and down-converted to baseband. RF signals from multiple antenna points $2_1, \ldots, 2_i, \ldots, 2_N$ are, typically passively, combined at the base station 3. Another solution comprises down-converting the signal to intermediate frequency (IF) and transmitting with low loss over e.g. Category 5 (cat 5) cables. Passive combination of signals from multiple antenna points $2_1, \ldots, 2_i, \ldots, 2_N$ can be done on IF.

In common for active DAS implementations is that it may be possible to tag the signals transmitted from or received by different antenna points $2_1, \ldots, 2_i, \ldots, 2_N$ with information identifying which antenna point $2_i$ transmitted or received which signal. Different methods for such tagging are known in the art. One example is to inject a unique signature at the antenna point $2_1, \ldots, 2_i, \ldots, 2_N$ or before the (passive) combination of the signals. This signature may be detected and hence the antenna point $2_i$ transmitting or receiving a signal may be identified. Multiple signatures may also possibly be detected with different relative strengths. It is noted that this is not possible in a passive DAS, where the signals from different antenna points are coherently (passively) combined throughout the system, and thus indistinguishable when arriving at the base station 3.

The base station 3 transmits downlink (DL) data to and receives uplink (UL) data from any user terminal 4 connected to the indoor cell that is controlled by the base station 3. The received signal strength (or equivalently received power) at antenna point $2_i$ is denoted $P_i$, and for each time unit (e.g. time slot) the base station 3 may measure which antenna point $2_i$ has the highest received signal strength $P_i$, $i=1, \ldots, N$, for a particular transmission from a particular user terminal. This may e.g. be done by using the above mentioned tagging of signals. For instance, for a certain transmission that is received at two different antenna points, a signature that is specific for each antenna point (an antenna point specific signature) is added to each of the two respective signals. Thereby the antenna point at which the strongest signal was received may be identified. It is noted that the antenna point at which the next strongest signals was received (and third strongest signal and so on) may also be identified.

Figure 7:
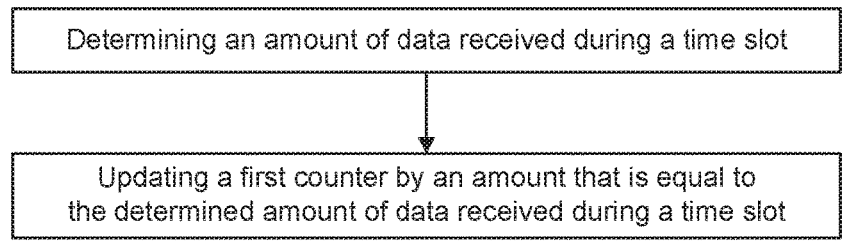
FIG. 7 illustrates a method of updating a counter according to some embodiments.

Thereafter the amount of received data in this time slot is added to a counter $D_i$. The amount of data may for instance be measured in number of bits received. This method of updating the counter Di is illustrated in FIG. 7. The counter $D_i$ is thus arranged to keep track of the total amount of data received in antenna point $2_i$ when antenna point $2_i$ had the highest received power. At the end of a measurement period (spanning e.g. anything from a number of time slots, hours or days to weeks), the fraction $T_i$ of data received by each antenna point $2_1, 2_i, \ldots, 2_N$ may be calculated according to:

$$T_i = D_i / \Sigma_i D_i.$$

Figure 6:
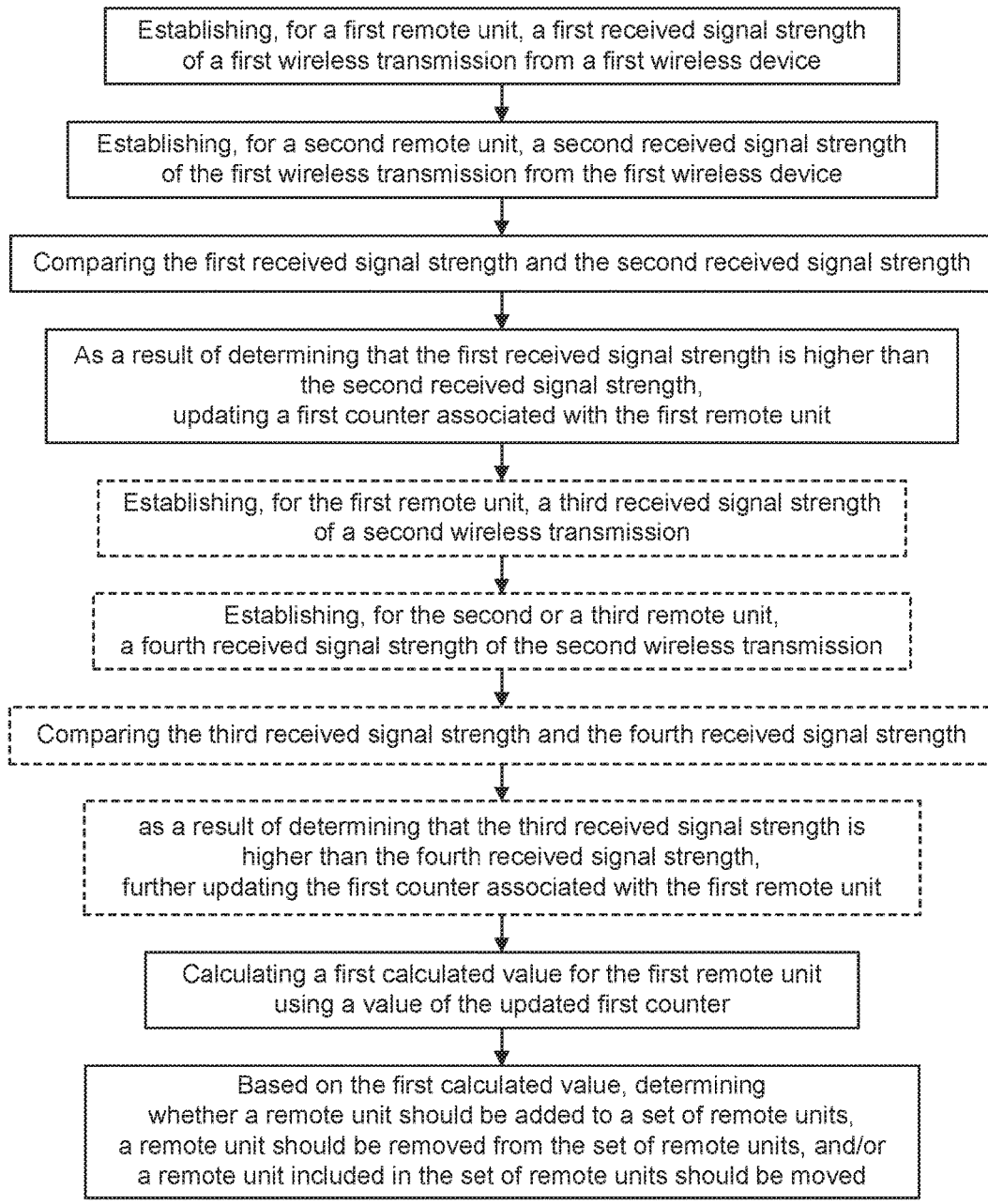
FIG. 6 is a flow chart illustrating a process according to some embodiments.
Figure 9:
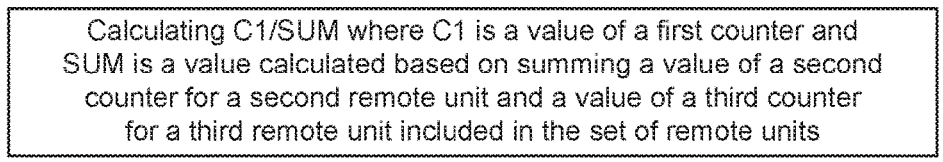
FIG. 9 illustrates a method of calculating a value for a remote unit according to some embodiments.

This will be a measure of the usefulness of each antenna point $2_1, \ldots, 2_i, \ldots, 2_N$ with respect to the data traffic location: a high $T_i$ indicates high usefulness, and a low $T_i$ indicates low usefulness. This method of determining the usefulness of each antenna point is illustrated in FIG. 9. An antenna point having a high $T_i$ thus means that this antenna point has received a large part of the traffic within the cell, while an antenna point having a low $T_i$ has received only a small fraction of all traffic in the cell. The usefulness, or importance, of a certain antenna point can hence be deduced and used for evaluating the current deployment and/or for use in future deployments. The process of determining the usefulness of an antenna point described above is illustrated in FIG. 6.

In this context it may be noted that a wireless communication sent from a user terminal 4 is often received only by one antenna point, or by two or a few antenna points (i.e. typically not by all antenna points of the DAS 1).

Figure 8:
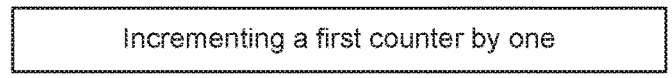
FIG. 8 illustrates a method of updating a counter according to some embodiments.

In another embodiment according to the present teachings, only the number of received data packets per antenna point $2_1, 2_i, \ldots, 2_N$ is recorded, e.g. in a counter $G_i$. That is, the actual amount of data is not recorded, but simply the number of times that data has been received at antenna point $2_i$ and the number of times that antenna point $2_i$ had the highest received signal strength. The method of updating the counter $G_i$ according to this embodiment is illustrated in FIG. 8. This also gives a measure on usefulness of the respective antenna points.

The present teachings may also be used for discovering and preventing coverage holes within the cell.

In yet another embodiment, a measure on the received power $P_i$ at antenna point 2; for each user terminal 4 in the cell is stored in a counter $E_i$ corresponding to this antenna point $2_i$. At the end of a measurement period, the fraction $F_i$ for each user and antenna point $2_1, \ldots, 2_i, \ldots, 2_N$ in the cell may be calculated according to:

$$F_i = E_i \bigg/ \sum_i E_i$$

Averaging $F_i$ over all users in the cell will be a measure on how well or badly each antenna point $2_1, \ldots, 2i, \ldots, 2_N$ is positioned with respect to indoor user positions. In this context, "badly positioned" may for instance refer to the position of an antenna point that often receives only a low transmission power.

In another embodiment the second strongest signal strength, $P_j$, (i.e. second highest received power) of node $2_j$ may also be recorded and used. Such second strongest signal strength $P_j$ may for instance be used if it is within a certain range of the strongest received signal strength $P_i$. The range may be selected such that the second highest received power $P_j$ is considered to contribute to the received signal when combined with the highest received power. The amount of received data logged in the counter $D_j$ should then be a fraction of the actual data received during this time slot.

In another embodiment, information on the received signal strength $P_i$ per antenna point is collected, e.g. information on the strongest received signal strength $P_i$ per antenna point. The distributions of the strongest received signals per antenna point may be compared, and indications that there is a coverage hole may be obtained. For instance, if the information shows that a significant fraction of highest signal strengths received at one antenna point is received at a low power (i.e. highest signal strength of a communication is received at low power), this indicates that deploying an additional antenna point nearby could improve the coverage and performance. Furthermore, as above, the usefulness of each antenna point may be calculated. If the antenna point with a significant fraction of low values on received signal strengths also has a high amount of received data (high usefulness), this is a strong indication of a coverage hole problem, i.e. the antenna point should be repositioned or an additional antenna point should be added.

If the antenna point has low usefulness (not much data received) and low values on received signal strength this is not considered as a coverage hole. The usefulness may e.g. be measured as fraction of received data, and if this fraction is found to be low, while at the same time the antenna point has low values on received signal strength, this is not an indication on coverage hole, but rather an indication that the antenna point is not needed (or that it could be moved to a more suitable location.

In many IBS deployments the uplink coverage is good and uplink transmissions are less often power limited (i.e. reaches seldom its maximum allowable uplink power). The received uplink power $P_i$ then reaches the power control target set by the network node and an indication of that an antenna point might be lacking may be determined based on the fraction of uplink transmissions not reaching the power target. That is, if the target uplink power is not reached, the user terminal 4 has increased its transmit power and then this indicates that the user terminal 4 has bad coverage, in turn suggesting a need for an additional antenna point.

When, for a certain highest signal strength $P_i$ received at a first antenna point $2_i$ that is also identified as having a significant fraction of low values on this highest signal strength, the second strongest received signal strength $P_j$ (received at a second antenna point $2_j$) of a transmission may also be recorded. The significant fraction of low values on signal strength may be an indication that an additional antenna point is needed between the first and second antenna points $2i, 2_j$ both receiving the current transmission. The position of the second antenna point $2_j$ receiving the second strongest signal may be seen as a hint as to where (in which direction in relation to the first antenna point $2_i$) to locate such additional antenna point. For instance, the signal strength may reduce in this direction or it may indicate that the distance between the two antenna points may be too large.

When two or more received signal strength values are logged, i.e. the highest signal strength value (received at first antenna point), the second highest signal strength value (received at second antenna point) etc., this may indicate that one or more antenna points $2_1, \ldots, 2_i, \ldots, 2_N$ may be removed from the DAS 1 without affecting the coverage too much. That is, if the communication from a user terminal is received by multiple antenna points, this may indicate that there is a surplus number of antenna points. To measure this, a counter $R_i$ may be used for each antenna point $2_i$, wherein $R_i$ indicates how often an antenna point $2_i$ may be replaced by another antenna point. An antenna point may for instance be replaced when either one of the highest and the second highest signal strength would give an acceptable service. An antenna point may be considered as surplus, i.e. may be replaced by another antenna point, when both of the following conditions are met:

antenna point $2_i$ is the antenna point with the strongest received signal strength for an UL transmission, and there is another antenna point where the received signal strength is within a certain range of the strongest received signal strength.

The counter $R_i$ is thus updated every time both of the above conditions are met. If the counter $R_i$ reaches a high value, the corresponding antenna point could be removed.

In another embodiment, the received DL signal strength as reported by the user terminals 4 (e.g. Reference Signal Received Power (RSRP) in case LTE) is used instead of using the measured received UL signal strength. In a way corresponding to the UL signal strength measurement: if an antenna point $2_i$ receives a high number of measurement reports with very low RSRP values (e.g. low as compared to some absolute reference value or compared to values collected by other antenna points) there may exist a coverage hole, and additional antenna points should be installed. For the DL case, there is a need to know at which antenna point a certain RSRP report is received. This may for instance be accomplished by correlating the report with the signal strength upon reception of the RSRP report, or by collecting statistics as described in the following.

In some embodiments, the method may also comprise collecting statistics for DL data. When UL data has been received from a user terminal 4 the user terminal identity may be stored together with an index of the strongest antenna point (as detected e.g. when the UL data was received). The identity and the index is preferably only stored for a period of time, since it will become invalid if the user terminal 4 changes position between the time of detection of the strongest UL antenna point and the time of transmitting DL data. If the data is still available, i.e. it is still deemed to be relevant, when a DL transmission is to be scheduled by the base station 3 to the user terminal 4, a data counter associated with the antenna point stored together with the user terminal identity is updated with the amount of data that is to be transmitted to the user terminal. As an alternative, if only the number of data packets per radio point is logged, then the number of data packets is increased by one for the antenna point associated with the user terminal 4 to be scheduled.

Another way to measure the usefulness of different antenna points $2_1, \ldots, 2_i, \ldots, 2_N$ is to have the DAS 1 enter an evaluation mode. This evaluation mode may be configured to happen regularly with preconfigured time intervals, or upon a direct request. During such an evaluation the amount of traffic may be measured with all antenna points $2_1, \ldots, 2_i, \ldots, 2_N$ switched on, and then the DAS 1 turns off one antenna point at a time and measures either the throughput degradation or the loss in traffic.

To ensure that this evaluation mode does not cause disruptions in the services provided by a network, which the DAS 1 is part of, some pre-conditions should be fulfilled before entering the evaluation mode. One example of such pre-condition may be that the DAS 1 operates on several frequency bands, or several carriers, or several channels. The evaluation procedure of turning off antenna points may then be executed only on one of those frequency bands, carriers or channels, i.e. the antenna point is not fully turned off, it just stops transmitting and receiving the signals on one frequency, carrier or channel.

Another pre-condition for entering the evaluation mode may be that there is good enough back-up coverage from one or several outdoor macro base station(s), i.e. that the user terminals 4 may be handed over to such macro base station(s) in case the antenna point that is turned off is the one serving it. This back-up coverage may be indicated by measurement reports from user terminals 4 regarding neighboring cells.

Yet another such pre-condition may be to measure the received power vector $P_i$ from all user terminals 4 in the cell during a time period for each antenna point $2_i$. If all received powers $P_i$ for an antenna point $2_i$ is below a threshold, this antenna point $2_i$ can be turned off and the DAS 1 can enter the evaluation mode.

The present teachings disclose several ways to determine the usefulness of each antenna point in an active DAS system, i.e. when antenna points may be removed and when additional antenna points are needed. The usefulness may be expressed by antenna point usefulness indicators (KPI among others).

In various embodiments, the output on the usefulness may be given through an interface of the base station 3 where data is presented in numbers or figures. Examples of statistical figures comprise fraction of traffic where antenna point is strongest and second strongest, fraction of traffic where an antenna point is the sole connection, fraction of traffic with bad coverage (signal strength below certain threshold). Also more advanced planning advices can be indicated such as suggesting that a particular antenna point can be removed, should be moved or should be added.

The output may also be visualized in a more direct manner at the position of each antenna point, e.g. by adding an indicator light to the antenna point or close to the antenna point. The indicator light may display the usefulness by a certain color. Red indicator light may for instance be selected for indicating that this particular antenna point has low usefulness, which is thus easy to detect visually at site. Likewise, a green color may be selected to indicate high usefulness. The antenna points having a red indicator light may be removed from the DAS 1 without any major impact on the performance of the DAS 1.

FIG. 2 illustrates an exemplary scenario and processing according to aspects of the present teachings. In particular, FIG. 2 illustrates the case of a particular UL transmission being received at three antenna points: a first antenna $2_1$, a second antenna $2_2$, and a third antenna point $2_3$. The signals received at the three antenna points are combined at the base station 3. The user terminal 4 may be closest to the third antenna point $2_3$ (the rightmost one), and the received signal strength $P_3$ may therefore be stronger at the third antenna point than the signal strength $P_2$ received at the second antenna point, which is stronger than the signal strength $P_1$ received at the first antenna point. It is noted that the received signal strength is not only and unambiguously determined by distance between user terminal and antenna point, i.e. there are other parameters than distance between user terminal 4 and antenna point that determines the received signal strength.

The analog combiner 5 may report which antenna point $2_i$ received the strongest signal, which in this case is the third antenna point $2_3$. The analog combiner 5 may also report which antenna point received the second strongest (second antenna point $2_2$) and which received the third strongest (first antenna point $2_1$). Such reporting is indicated by the arrow "maxind (P1,P2,P3)" from the analog combiner 5 to a counter collection system 7. In some embodiments, also the next strongest signal is reported. Still further signal strengths (third strongest, fourth strongest etc.) may also be reported, if more antenna points receives the wireless communication to be combined.

In order to decode the data, the signals are combined in analog domain e.g. in an analog combiner 5, and the data is then extracted by digital processing means 6. The output from the digital processing means 6 is indicated in the figure by "extracted data". Once the digital processing is performed, the amount of data received may be reported to the counter collection system 7 of the base station 3, which system can then count up the corresponding counter for the third antenna point $2_3$ accordingly.

There may be several counters associated with each antenna point $2_i$, e.g. one counter counting the number of occurrences of the antenna point $2_i$ having the highest signal strength, one counter counting the amount of data received when antenna point $2_i$ had the highest received power, etc. The counter collection system 7 may thus, for instance, comprise the counters $D_i$, $E_i$ and $R_i$ as have been described, as well as other counters for establishing usefulness of an antenna point.

FIG. 3 is a flow chart illustrating aspect of the present teachings. In particular, FIG. 3 summarizes some aspects of the present teachings, e.g. as described above with reference to FIG. 2. The flow 100 of FIG. 3 starts at box 101, wherein an UL transmission is received at one or more antenna points. The respective signal received at the respective antenna points may be tagged, as described earlier, so that the respective received signal strengths for the UL transmission at the different antenna points can be determined.

In box 102 the signals received at the antenna point(s) are combined. This combining of the signals may be done by analog processing.

Before the combination, the respective signal strengths of the different contributing received signals may be determined as described earlier. Box 105 indicates this by an example: the antenna point that has the strongest signal for the UL transmission is detected.

In box 103, the data is decoded, i.e. extracted, which may be done by digital processing.

In box 104, the amount of data is recorded as reported from e.g. the digital processing means 6.

In box 106, the amount of data for the antenna point that had the strongest signal for the UL transmission is recorded, and a counter $D_i$ for this antenna point is updated accordingly. It is noted that the amount of data for the antenna point that had the next strongest signal (and so on) may also be recorded.

In box 107, based on the recording done in box 106 and/or determination of box 105, the usefulness of the antenna points can be established. For instance, the usefulness of the antenna point receiving the highest signal strength can be established.

The various features and embodiments that have been described may be combined in different ways, examples of which are given in the following.

Figure 4:
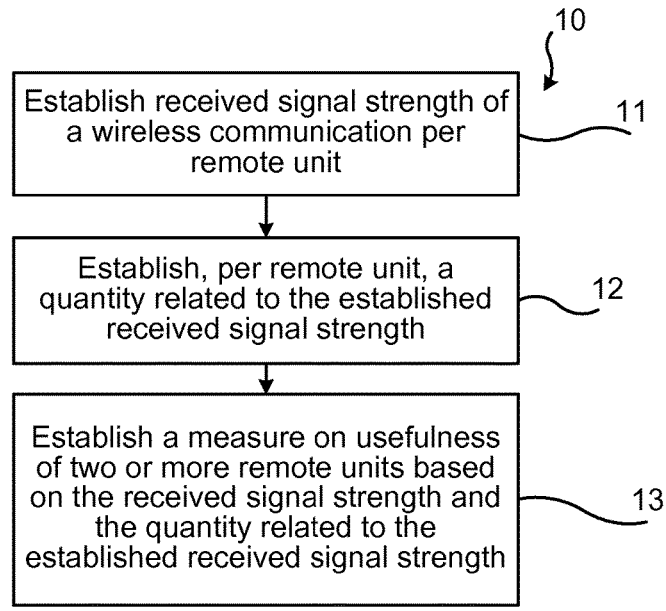
FIG. 4 illustrates a flow chart over steps of a method in a network node in accordance with the present teachings.
Figure 4:
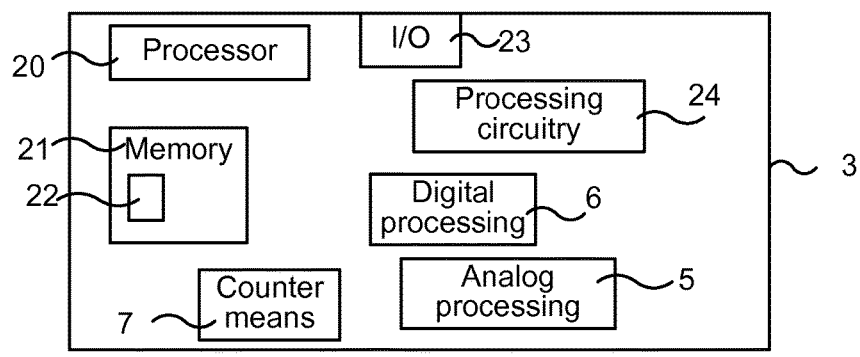

FIG. 4 illustrates a flow chart over steps of a method in a network node in accordance with the present teachings. The method 10 may be performed in a network node 3 of a wireless communications system, for instance in an eNB. The network node 3 monitors one or more, preferably at least two, remote units $2_1, \ldots, 2_i, \ldots, 2_N$ of a distributed antenna system 1. The network node 3 may typically monitor all remote units $2_1, \ldots, 2_i, \ldots, 2_N$ of the distributed antenna system 1, and the more remote units that are monitored, the more complete overview of the DAS 1, e.g. in view of coverage, may be obtained.

The method 10 comprises establishing 11 received signal strength of a wireless communication (e.g. an uplink transmission) per remote unit $2_1, \ldots, 2_i, \ldots, 2_N$. For instance, for a wireless communication, transmitted by the user terminal 4, and received at two remote units, the received signal strengths at the respective two remote units are obtained. This may, as has been described e.g. with reference to FIG. 3, be done by tagging the received wireless communication with a signature that is specific for each remote unit, and establishing the respective signal strengths before combining the wireless communications.

The method 10 comprises establishing 12, per remote unit $2_1, \ldots, 2_i, \ldots, 2_N$, a quantity related to the obtained received signal strength. For instance, the quantity may comprise the number of received wireless transmissions or number of times that the remote unit had highest received signal strength for a particular wireless communication. That is, the quantity may be that the reception of the wireless communication (sent from a user terminal 4) at a particular remote unit has the highest received signal strength among all remote units (typically a few at most) that received the same wireless transmission.

The method 10 comprises establishing 13 a measure on usefulness of two or more remote units $2_1, \ldots, 2_i, \ldots, 2_N$ based on the received signal strength and on the quantity related to the obtained received signal strength.

In various embodiments the quantity related to the obtained received signal strength comprises one or more of: number of received wireless transmissions, number of received uplink data bits, and number of transmitted downlink data bits.

In an embodiment the establishing 11 of received signal strength per remote unit $2_1, \ldots, 2_i, \ldots, 2_N$ is performed for the duration of a time slot. The establishing 12 the quantity comprises adding, in a respective counter for the remote units $2_1, \ldots, 2_i, \ldots, 2_N$, number of data bits $D_i$ for the remote unit $2_1, \ldots, 2_i, \ldots, 2_N$ having the highest received power in the time slot. The establishing 13 of the measure of usefulness $T_i$ of each of the remote units $2_1, \ldots, 2_i, \ldots, 2_N$ comprises calculating, for a number of time slots, fraction of data bits $D_i$ on each remote unit $(2_1, \ldots, 2_i, \ldots, 2_N)$ of the total number of data bits. This may be expressed as $T_i = D_i / \Sigma_i D_i$.

In another embodiment, the establishing 11 of received signal strength per remote unit $2_1, \ldots, 2_i, \ldots, 2_N$ is performed for the duration of a time slot, the establishing 12 the quantity comprises increasing by one a respective counter $G_i$ provided for each of the remote units $2_1, \ldots, 2_i, \ldots, 2_N$, for the remote unit $2_1, \ldots, 2_i, \ldots, 2_N$ having received data and having the highest received power in the time slot, and the establishing 13 of the measure of usefulness of the two or more remote units $2_1, \ldots, 2_i, \ldots, 2_N$ comprises establishing a counter reading of the respective counters $G_i$.

In variations of the above two embodiments, the method 10 comprises, prior to the establishing 13 of the measure of usefulness, repeating the establishing 11 the received signal strength and establishing 12 the quantity. The more information that is collected (the longer the time period is) the more accurate measure of usefulness is obtained.

In an embodiment, the establishing 11 the received signal strength per remote unit $2_1, \ldots, 2_i, \ldots, 2_N$ comprises identifying a first received signal strength as associated with a first remote unit $2_i$ based on a remote unit specific signature injected on top of a received first signal, and measuring a relative strength of different remote unit specific signatures in a combined signal, the combined signal comprising the received first signal.

In various embodiments, the method 10 comprises turning off the remote units $2_1, \ldots, 2_i, \ldots, 2_N$ one by one and observing variations in performance or traffic, e.g. by observing variations in received signal strength and/or quantity.

In an embodiment, the method 10 comprises, before turning off a remote unit $2_1, \ldots, 2_i, \ldots, 2_N$, ensuring that a condition is fulfilled, the condition comprising ensuring that the distributed antenna system 1 operates on two or more frequency bands, channels or carriers, or ensuring that coverage is provided by another network node for user terminals 4 using the remote unit $2_1, \ldots, 2_i, \ldots, 2_N$ to be turned off.

In an embodiment, the establishing 11 comprises establishing the received signal strength for two remote units $2_1, \ldots, 2_i, \ldots, 2_N$ and increasing a counter $R_i$ for the i:th remote unit $2_i$ when the i:th remote unit $2_i$ has the highest received signal strength, and at least one other the remote unit $2_k$ has a received signal strength within a set range of the highest received signal strength. By means of this embodiment, an indication may be obtained on when an antenna point could possibly be removed.

In an embodiment, the method 10 comprises using the measure on usefulness for establishing that a remote unit $2_1, \ldots, 2_i, \ldots, 2_N$ should be removed, moved or added. This can be done in different way as have been described.

For instance, in an embodiment, the method 10 comprises establishing need for an additional remote unit $2_i$ by identifying a first remote unit $2_1$ to have a significant fraction of low values when having the highest signal strength of the wireless communication.

In a variation of the above embodiment, a preferred location of the additional remote unit $2_i$ is determined based on establishing which remote unit has the second highest signal strength when the first remote unit $2_1$ has the highest signal strength. This may give an indication on e.g. in which direction to place the additional antenna.

In an embodiment, the method 10 comprises indicating a respective usefulness of the two or more remote units $2_1, \ldots, 2_i, \ldots, 2_N$ in the respective remote units $2_1, \ldots, 2_i, \ldots, 2_N$ visually and/or audibly.

In various embodiments, the method 10 may be performed in a network node 3 of the wireless communications system 20, for instance in an eNB in case of LTE.

Figure 5:
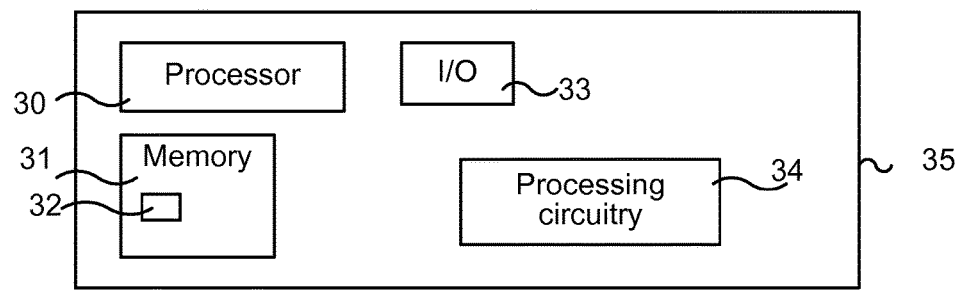
FIG. 5 illustrates schematically a wireless communications system and means for implementing embodiments in accordance with the present teachings.

FIG. 5 illustrates schematically a wireless communications system comprising at least one network node 3 for implementing embodiments in accordance with the present teachings. The wireless communications system comprises the network node 3 and possibly still other nodes or entities (indicated at reference numeral 35 in FIG. 5) as have been described earlier, e.g. in relation to FIG. 1. The described method 10 may be implemented in a single network node or entity, or in two or more nodes or entities, i.e. in a distributed manner.

The wireless communications systems 20 comprises one or more a processors 20, 3o comprising any combination of one or more of a central processing unit (CPU), multiprocessor, microcontroller, digital signal processor (DSP), application specific integrated circuit etc. capable of executing software instructions stored in a respective memory 21, 31 which can be a computer program product 21, 31. The processors 20, 30 can be configured to execute any of the various embodiments of the method for instance as described in relation to FIG. 4, or parts of the steps of the method.

Each memory 21, 31 can be any combination of read and write memory (RAM) and read only memory (ROM), Flash memory, magnetic tape, Compact Disc (CD)-ROM, digital versatile disc (DVD), BLU-RAY disc etc. Each memory 21, 31 may also comprise persistent storage, which, for example, can be any single one or combination of magnetic memory, optical memory, solid state memory or even remotely mounted memory.

The one or more nodes 3, 35 also comprises a respective input/output device 23, 33 (indicated by I/O in FIG. 5) for communicating with other entities, e.g. with other devices of a network, with a gateway providing connectivity e.g. to an external packet data network. Such input/output device 23, 33 may comprise a communication interface, for instance configured for wireless communication using IEEE 802.11. For this communication, the nodes 3, 35 may also comprise receiving circuitry, transmission circuitry, antenna devices etc. (not illustrated).

The one or more nodes 3, 35 may also comprise analog processing means 5, digital processing means 6 and counter means 7, as have been described earlier e.g. with reference to FIG. 2. These means 5, 6, 7 may be provided in a single node or in several nodes in a distributed fashion, wherein e.g. a first node comprises the analog and digital processing means 5, 6 while a second node comprises the counter means 7. In a preferred embodiment, the embodiments of the method are implemented in a single network node 3, e.g. an eNB.

The wireless communications systems 20, in particular the nodes 3, 35 thereof, may also comprise additional processing circuitry, schematically indicated at reference numeral 24 and 34, respectively, for implementing the various embodiments of the present teachings.

The present teachings provide computer programs 22, 32 for the wireless communications systems 20. The computer programs 22, 32 comprises computer program code, which, when executed on at least one processor 20, 30 on wireless communications systems 20 causes the wireless communications systems 20 to perform the method 10 according to any of the described embodiments thereof.

The present disclosure also encompasses computer program products 21, 31 comprising a computer program 22, 32 for implementing the embodiments of the method as described, and a computer readable means on which the computer program 22, 32 is stored. The computer program product 22, 32 may, as mentioned earlier, be any combination of random access memory (RAM) or read only memory (ROM), Flash memory, magnetic tape, Compact Disc (CD)-ROM, digital versatile disc (DVD), BLU-RAY disc etc.

A wireless communications system 20 is provided for establishing usefulness of remote units. The wireless communications system 20 is configured to monitor one or more remote units $2_1, \ldots, 2_i, \ldots, 2_N$ of a distributed antenna system 1. The wireless communications system 20 is configured to:

establish, per remote unit $2_1, \ldots, 2_i, \ldots, 2_N$, received signal strength of a wireless communication, establish, per remote unit $2_1, \ldots, 2_i, \ldots, 2_N$, a quantity related to the obtained received signal strength, and establish a measure on usefulness of each of two or more remote units $2_1, \ldots, 2_i, \ldots, 2_N$ based on the received signal strength and on the quantity.

The wireless communications system 20 may be configured to perform the above steps e.g. by comprising one or more processors 20, 30 and memory 21, 31, the memory 21, 31 containing instructions executable by the processor 20, 30, whereby the wireless communications system 20 is operative to perform the steps.

In various embodiments, the quantity related to the obtained received signal strength comprises one or more of: number of received wireless transmissions, number of received uplink data bits, and number of transmitted downlink data bits.

In an embodiment, the wireless communications system 20 is configured to:

establish the received signal strength per remote unit $2_1, \ldots, 2_1, \ldots, 2_N$ for the duration of a time slot, establishing the quantity by adding, in a respective counter for the remote units $2_1, \ldots, 2_i, \ldots, 2_N$, number of data bits $D_i$ for the remote unit $2_1, \ldots, 2_i, \ldots, 2_N$ having the highest received power in the time slot, and the establish the measure of usefulness $T_i$ of each of the two or more remote units $2_1, \ldots, 2_i, \ldots, 2_N$ by calculating, for a number of time slots, fraction of data bits $D_i$ on the two or more remote units $2_1, \ldots, 2_i, \ldots, 2_N$ of the total number of data bits.

In an embodiment, the wireless communications system 20 is configured to:

establish the received signal strength per remote unit $2_1, \ldots, 2_i, \ldots, 2_N$ for the duration of a time slot, establish the quantity by increasing by one a respective counter $G_i$ provided for each of the remote units $2_1, \ldots, 2_i, \ldots, 2_N$, for the remote unit $2_1, \ldots, 2_i, \ldots, 2_N$ having received data and having the highest received power in the time slot, and establish the measure of usefulness of the two or more remote units $2_1, \ldots, 2_i, \ldots, 2_N$ by establishing a counter reading of the respective counters $G_i$.

In an embodiment, the wireless communications system 20 is configured to, prior to the establishing of the measure of usefulness, repeat the establishing the received signal strength and the establishing the quantity.

In an embodiment, the wireless communications system 20 is configured to establish the received signal strength per remote unit $2_1, \ldots, 2_i, \ldots, 2_N$ by identifying a first received signal strength as associated with a first remote unit $2_i$ based on a remote unit specific signature injected on top of a received first signal, and measuring a relative strength of different remote unit specific signatures in a combined signal, the combined signal comprising the received first signal.

In an embodiment, the wireless communications system 20 is configured to turn off the remote units $2_1, \ldots, 2_i, \ldots, 2_N$ one by one to observe variations in received signal strength and/or quantity.

In an embodiment, the wireless communications system 20 is configured to, before turning off a remote unit $2_1, \ldots, 2_i, \ldots, 2_N$, ensure that a condition is fulfilled, the condition comprising ensuring that the distributed antenna system 1 operates on two or more frequency bands, channels or carriers, or ensuring that coverage is provided by another network node for user terminals 4 using the remote unit $2_1, \ldots, 2_i, \ldots, 2_N$ to be turned off.

In an embodiment, the wireless communications system 20 is configured to establish the received signal strength for two remote units $2_1, \ldots, 2_i, \ldots, 2_N$ and to increase a counter $R_i$ for the i:th remote unit $2_i$ when:

the i:th remote unit $2_i$ has the highest received signal strength, and at least one other the remote unit $2_k$ has a received signal strength within a set range of the highest received signal strength.

In an embodiment, the wireless communications system 20 is configured to use the measure on usefulness for establishing that a remote unit $2_1, \ldots, 2_i, \ldots, 2_N$ should be removed, moved or added.

In an embodiment, the wireless communications system 20 is configured to establish a need for an additional remote unit $2_i$ by identifying a first remote unit $2_1$ to have a significant fraction of low values when having the highest signal strength of the wireless communication.

In an embodiment, the wireless communications system 20 is configured to determine a preferred location of the additional remote unit $2_i$ based on establishing which remote unit has the second highest signal strength when the first remote unit $2_1$ has the highest signal strength.

In an embodiment, the wireless communications system 20 is configured to indicate a respective usefulness of the two or more remote units $2_1, \ldots, 2_i, \ldots, 2_N$ in the respective remote units $2_1, \ldots, 2_i, \ldots, 2_N$ visually and/or audibly.

In an embodiment, the wireless communications system 20 comprises a network node 3, in which the various embodiments are performed.

The computer program products, or the memories, comprises instructions executable by the processor 20, 30. Such instructions may be comprised in a computer program, or in one or more software modules or function modules.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In an aspect, a wireless communications system is provided for establishing usefulness of remote units. The wireless communications system monitors one or more remote units of a distributed antenna system. The wireless communications system comprises first means for establishing, per remote unit, received signal strength of a wireless communication. Such first means may comprise processing circuitry adapted for such establishing (e.g. processing circuitry 24, 34 adapted for such establishing).

The wireless communications system comprises second means for establishing, per remote unit, a quantity related to the obtained received signal strength. Such second means may comprise processing circuitry adapted for such establishing, e.g. processing circuitry 24, 34 adapted for such establishing and/or counter means 7 and/or analog processing means 5 and/or digital processing means 7 or any combination thereof.

The wireless communications system comprises a third means for establishing a measure on usefulness of each of two or more remote units based on the received signal strength and on the quantity. Such third means may comprise processing circuitry adapted for such establishing, e.g. processing circuitry 24, 34 adapted for such establishing.

The wireless communications system may comprise still further means for implementing the various steps and variations of the steps according to the present teachings.

The present teachings provide feedback on the usefulness of the different antenna points, which feedback may be used in many different ways to increase the efficiency of active DAS deployments. Either the particular deployment may be reconfigured, or guidelines for future deployments may be updated based on observations of existing deployments. One particular example is to fine-tune the required density of antenna points which could lead to significant cost savings for equipment and installation of future deployments. Another example relates to identifying how well the distribution of antenna points matches the spatial distribution of traffic. A good match between these will increase the gains from future cell splits in which different antenna points are associated with different cells rather than a common cell. Further, the proposed solution may help identify which antenna heads should belong to which cells. This per antenna point "KPI" simplifies and improves a reconfiguration compared to when only cell KPIs are available.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a wireless communications system, the wireless communications system monitoring a set of remote units, the set of remote units comprising a first remote unit and a second remote unit, the method comprising:
    establishing, for the first remote unit, a first received signal strength of a first wireless transmission from a first wireless device;
    establishing, for the second remote unit, a second received signal strength of the first wireless transmission from the first wireless device;
    comparing the first received signal strength and the second received signal strength;
    as a result of determining that the first received signal strength is higher than the second received signal strength, updating a first counter associated with the first remote unit;
    calculating a first calculated value for the first remote unit using a value of the updated first counter; and
    based on the first calculated value, determining whether a remote unit should be added to the set of remote units, a remote unit should be removed from the set of remote units, and/or a remote unit included in the set of remote units should be moved.

2. The method of claim 1, wherein the value of the updated first counter indicates a number of received wireless transmissions, a number of received uplink data bits, or a number of transmitted downlink data bits.

3. The method of claim 1, wherein:
    the first wireless transmission occurred during a time slot,
    the method further comprises determining an amount of data received during the time slot, and
    updating the first counter comprises updating the first counter by an amount that is equal to the determined amount of data received during the time slot.

4. The method of claim 1, wherein:
    the first wireless transmission occurred during a time slot, and
    updating the first counter comprises incrementing the first counter by one.

5. The method of claim 3, further comprising, after updating the first counter but prior to calculating the first calculated value for the first remote unit:
    establishing, for the first remote unit, a third received signal strength of a second wireless transmission;
    establishing, for the second or a third remote unit, a fourth received signal strength of the second wireless transmission;
    comparing the third received signal strength and the fourth received signal strength; and
    as a result of determining that the third received signal strength is higher than the fourth received signal strength, further updating the first counter associated with the first remote unit.

6. The method of claim 1, wherein the establishing of the first received signal strength or the second received signal strength comprises identifying a received signal strength as being associated with one of the first remote unit and the second remote unit based on a remote unit specific signature injected on top of a received signal, and measuring a relative strength of different remote unit specific signatures in a combined signal, the combined signal comprising the received signal.

7. The method of claim 1, further comprising turning off the set of remote units one by one and observing variations in received signal strength and/or quantity.

8. The method of claim 7, further comprising, before turning off a third remote unit, ensuring that the wireless communications system operates on two or more frequency bands, channels or carriers, or ensuring that coverage is provided by another network node for user terminals using the third remote unit.

9. The method of claim 1, wherein the updating of the first counter associated with the first remote unit comprises increasing the first counter associated with the first remote unit when:
    the first remote unit has the highest received signal strength of the first wireless transmission among one or more remote units receiving the first wireless transmission, and
    at least one other remote unit has a received signal strength of the first wireless transmission within a set range of the highest received signal strength.

10. The method of claim 1, further comprising using the first calculated value to determine whether a remote unit should be removed, moved, or added.

11. The method of claim 1, further comprising establishing whether an additional remote unit should be added by identifying a third remote unit to have a significant fraction of low values when having the highest received signal strength of a second wireless transmission among one or more remote units receiving the second wireless transmission.

12. The method of claim 11, wherein a location of the additional remote unit is determined based on establishing which remote unit has the second highest received signal strength of the second wireless transmission among said one or more remote units receiving the second wireless transmission.

13. The method of claim 1, further comprising visually and/or audibly providing feedback based on the first calculated value.

14. The method of claim 1, wherein calculating the first calculated value for the first remote unit comprises calculating: C1/SUM, wherein C1 is the value of the updated first counter and SUM is a value calculated based on summing a value of a second counter for the second remote unit and a value of a third counter for a third remote unit included in the set of remote units.

15. A computer program product comprising a non-transitory computer readable medium storing a computer program for a network node, the computer program comprising computer program code, which, when executed by a processing unit of the network node causes the network node to perform the method of claim 1.

16. A wireless communications system, the wireless communications system configured to monitor a set of remote units, the set of remote units comprising a first remote unit and a second remote unit, the wireless communications system being configured to:
- establish, for the first remote unit, a first received signal strength of a first wireless transmission from a first wireless device;
- establish, for the second remote unit, a second received signal strength of the first wireless transmission from the first wireless device;
- compare the first received signal strength and the second received signal strength; and
- as a result of determining that the first received signal strength is higher than the second received signal strength, update a first counter associated with the first remote unit;
- calculate a first calculated value for the first remote unit using a value of the updated first counter; and
- based on the first calculated value,
- determine whether a remote unit should be added to the set of remote units, a remote unit should be removed from the set of remote units, and/or a remote unit included in the set of remote units should be moved.

17. The wireless communications system as claimed in claim 16, wherein the value of the updated first counter indicates a number of received wireless transmissions, a number of received uplink data bits, or a number of received downlink data bits.

18. The wireless communications system as claimed in claim 16, wherein:
- the first wireless transmission occurred during a time slot,
- the wireless communications system is further configured to determine an amount of data received during the time slot, and
- updating the first counter comprises updating the first counter by an amount that is equal to the determined amount of data received during the time slot.

19. The wireless communications system as claimed in claim 16, wherein:
- the first wireless transmission occurred during a time slot, and
- updating the first counter comprises incrementing the first counter by one.

20. The wireless communications system as claimed in claim 18, wherein the wireless communications system is further configured to, after updating the first counter but prior to calculating the first calculated value for the first remote unit,
- establish, for the first remote unit, a third received signal strength of a second wireless transmission;
- establish, for the second or a third remote unit, a fourth received signal strength of the second wireless transmission;
- compare the third received signal strength and the fourth received signal strength; and
- as a result of determining that the third received signal strength is higher than the fourth received signal strength, further update the first counter associated with the first remote unit.

21. The wireless communications system as claimed in claim 16, wherein the establishing of the first received signal strength or the second received signal strength comprises identifying a received signal strength as being associated with one of the first remote unit and the second remote unit based on a remote unit specific signature injected on top of a received signal, and measuring a relative strength of different remote unit specific signatures in a combined signal, the combined signal comprising the received signal.

22. The wireless communications system as claimed in claim 16, wherein the wireless communications system is further configured to turn off the set of remote units one by one and to observe variations in received signal strength and/or quantity.

23. The wireless communications system as claimed in claim 22, wherein the wireless communications system is further configured to, before turning off a third remote unit, ensure that the wireless communications system operates on two or more frequency bands, channels or carriers, or ensure that coverage is provided by another network node for user terminals using the third remote unit.

24. The wireless communications system as claimed in claim 16, wherein the updating of the first counter associated with the first remote unit comprises increasing the first counter associated with the first remote unit when:
- the first remote unit has the highest received signal strength of the first wireless transmission among one or more remote units receiving the first wireless transmission, and
- at least one other remote unit has a received signal strength of the first wireless transmission within a set range of the highest received signal strength.

25. The wireless communications system as claimed in claim 16, wherein the wireless communications system is further configured to use the first calculated value to determine whether a remote unit should be removed, moved, or added.

26. The wireless communications system as claimed in claim 16, wherein the wireless communications system is further configured to establish whether an additional remote unit should be added by identifying a third remote unit to have a significant fraction of low values when having the highest received signal strength of a second wireless transmission among one or more remote units receiving the second wireless transmission.

27. The wireless communications system as claimed in claim 26, wherein the wireless communications system is further configured to determine a location of the additional remote unit based on establishing which remote unit has the second highest received signal strength of the second wireless transmission among said one or more remote units receiving the second wireless transmission.

28. The wireless communications system as claimed in claim 16, wherein the wireless communications system is further configured to visually and/or audibly provide feedback based on the first calculated value.

* * * * *